United States Patent [19]
Westhoff et al.

[11] Patent Number: 5,661,961
[45] Date of Patent: Sep. 2, 1997

[54] CROP PROCESSOR FOR ROUND HAY BALERS

[76] Inventors: Gerald F. Westhoff, P.O. Box 37, New Vienna, Iowa 52065; Loras F. Gravel, 31406 Hickory St.; Cory P. Westhoff, R.R. 2 Box 63, both of Dyersville, Iowa 52040

[21] Appl. No.: 522,932

[22] Filed: Sep. 1, 1995

[51] Int. Cl.⁶ .................................................. A01F 15/10
[52] U.S. Cl. ...................... 56/16.4 R; 56/505; 56/341; 460/113; 100/88
[58] Field of Search ...................... 56/16.4 R, 504, 56/505, 341; 460/112, 113; 100/88

[56] References Cited

U.S. PATENT DOCUMENTS

| | | | |
|---|---|---|---|
| 2,817,945 | 12/1957 | McClellan | 56/341 |
| 3,295,299 | 1/1967 | Brady et al. | 56/24 |
| 3,362,144 | 1/1968 | Bumgardner | 56/24 |
| 3,483,688 | 12/1969 | Hollyday | 56/341 |
| 3,604,188 | 9/1971 | Mott | 56/294 |
| 3,606,748 | 9/1971 | Middlesworth | 56/294 |
| 3,641,754 | 2/1972 | Anstee | 56/341 |
| 3,894,484 | 7/1975 | Anstey et al. | 100/5 |
| 4,280,320 | 7/1981 | Eggers | 56/341 |
| 4,550,552 | 11/1985 | Stiff | 56/505 X |
| 4,559,770 | 12/1985 | Mast | 56/341 |
| 4,747,260 | 5/1988 | Petrasch et al. | 56/505 |
| 5,052,170 | 10/1991 | Trenkamp et al. | 56/341 |

FOREIGN PATENT DOCUMENTS

| | | | |
|---|---|---|---|
| 8503230 | 1/1987 | Netherlands | 56/341 |

*Primary Examiner*—Terry Lee Melius
*Attorney, Agent, or Firm*—Jacobson, Price, Holman & Stern, PLLC

[57] ABSTRACT

A crop processor for attachment to a round hay baler for cutting, chopping and shredding various crops, especially hay and all types of crops with stems or stalks extending above ground with the cut, chopped or shredded crop being discharged into a round hay baler to form the processed crop into a round hay bale with the cut lengths of the crop material being useful for bedding, dry feeds, silage and other wet feeds and is especially useful in a total mixed ration mixing machine. The crop processor includes a high speed rotor with multiple cutting elements mounted thereon associated with a shear bar. The rotor and shear bar are oriented in a housing having an open bottom to enable a crop to be engaged and cut by the rotor and shear bar. The shear bar is horizontally adjustable toward and away from the rotor and cutting elements to vary the cutting, chopping and shredding characteristics of the crop processor in order to vary the cut length of crop material.

9 Claims, 5 Drawing Sheets

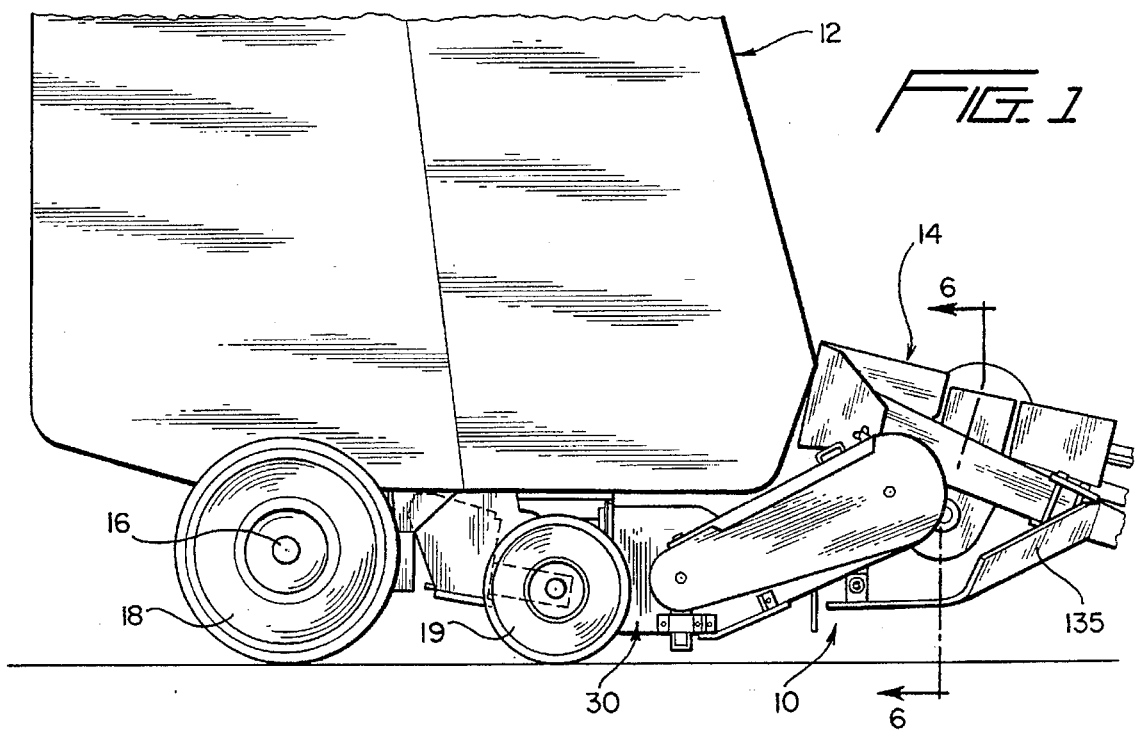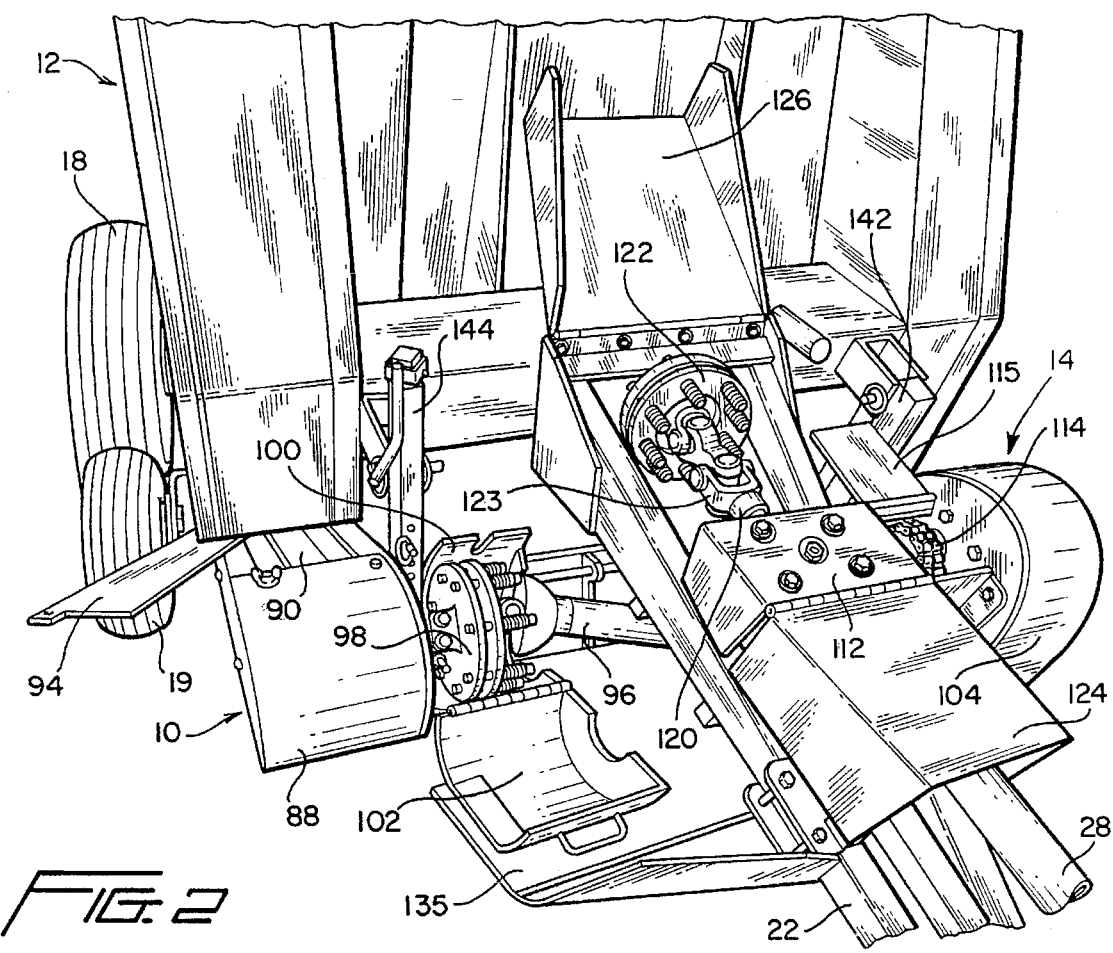

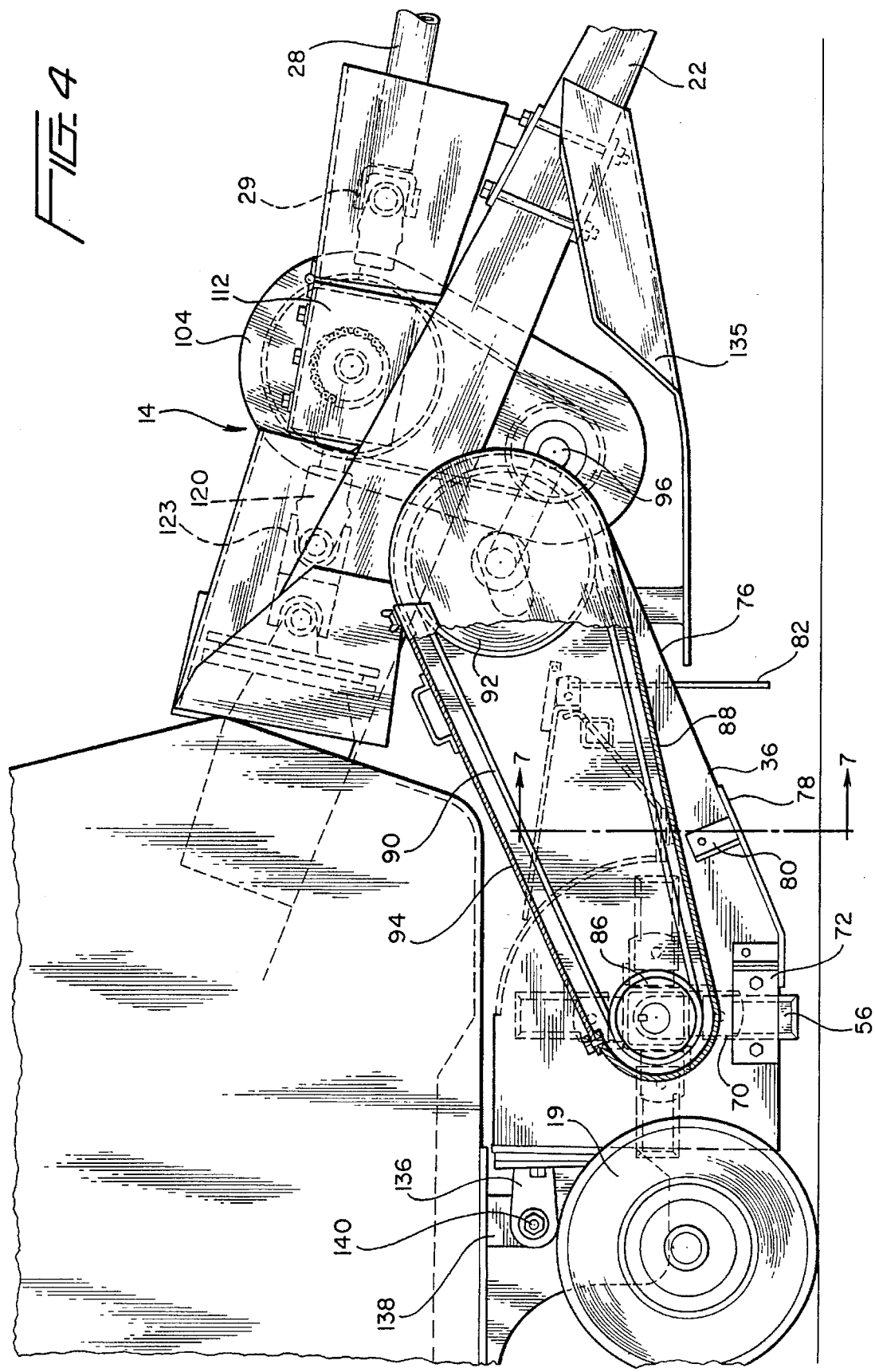

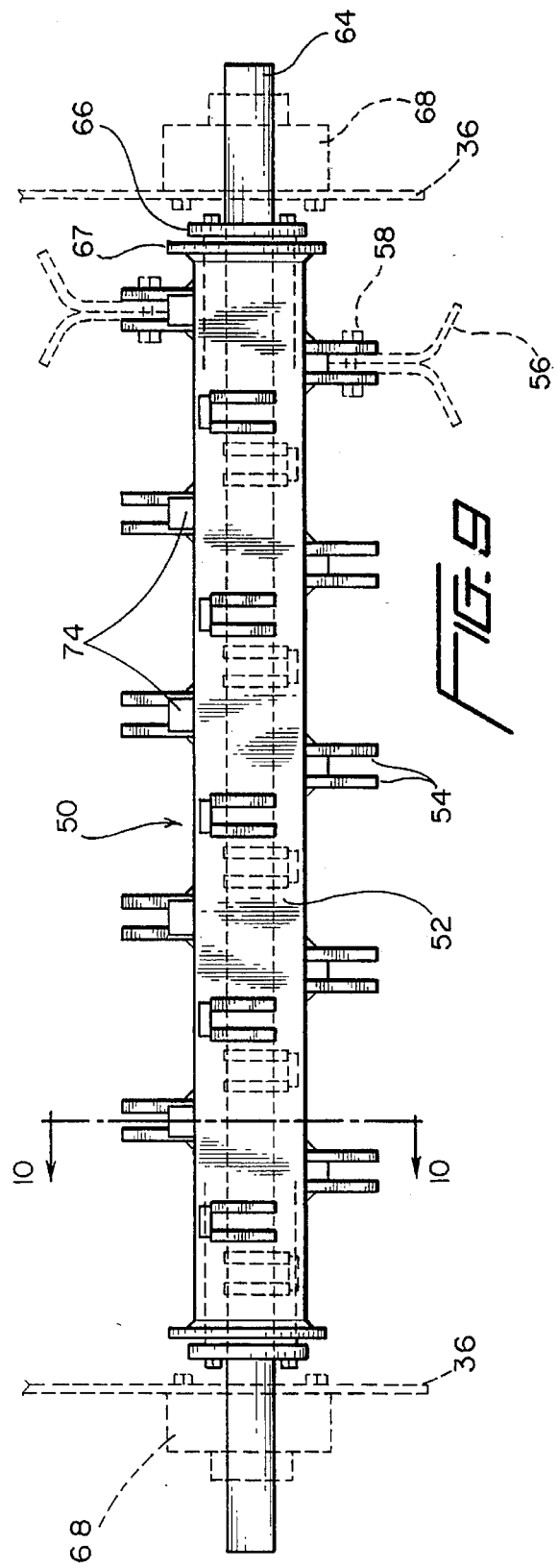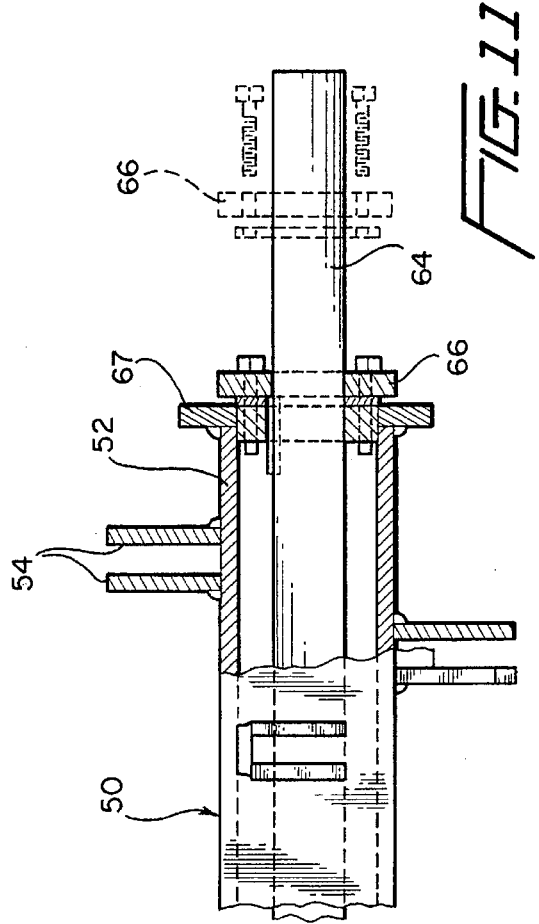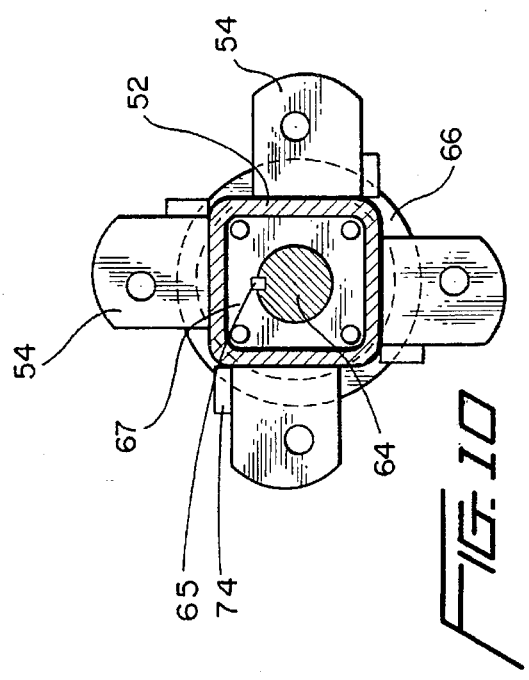

CROP PROCESSOR FOR ROUND HAY BALERS

BACKGROUND OF THE INVENTION

1. Field of the Invention

The present invention generally relates to a crop processor in the form of an attachment to a round hay baler for cutting, chopping and shredding various crops, especially hay and all types of crops with stems or stalks extending above ground. The cut, chopped or shredded crop is discharged into a round hay baler to form the processed crop into a round hay bale with the cut lengths of the crop material being useful for bedding, dry feeds, silage and other wet feeds and is especially useful in a total mixed ration mixing machine. The crop processor includes an open bottom housing having a high speed rotor with multiple knives mounted thereon. An adjustable shear bar is mounted in the housing to enable the crop to be processed to be cut at desired cut length by the knives on the spinning rotor as they pass the shear bar. The housing is located generally under the hitch area and forwardly of the existing wheels, hay entrance area and pickup tines of the round bale hay baler with the processed crop material being delivered to the round hay baler in the same location that hay would normally enter the baler to be baled. The shear bar is horizontally adjustable toward and away from the rotor and knives to vary the cutting, chopping and shredding characteristics of the crop processor in order to vary the cut length of crop material. The rotor is driven by a drive system which includes a forwardly positioned hitch extension and a gear box oriented forwardly of the baler drive system. The gear box is driven by the existing power takeoff shaft from a towing tractor. The hay baler is also driven from the gear box. The gear box drives an output shaft which is drivingly connected to the rotor through a chain coupler, PTO shaft and belt and pulley assemblies. The crop processor is supported from the hay baler to enable the apparatus to float upwardly when traversing uneven terrain such as through dips, small ditches, gopher mounds and the like with the apparatus returning to its normal cutting height due to gravity when traversing level terrain. The rotor is in the form of square tube with the pivotal knives being mounted on the flat side surfaces of the tube in staggered relation.

2. Description of the Prior Art

Shredding devices are well known for shredding stubble or stalks from a harvested crop. Such devices usually deposit the shredded material back onto the ground surface which would require a raking or pickup operation to collect and make use of the shredded material. Shredding devices also exist which discharge the shredded material into the baler to form bales of shredded material. Such devices are in the form of attachments to hay balers including hay balers which produce generally rectangular bales as well as hay balers which produce round hay bales. The following U.S. Patent Nos. relate to this subject matter. U.S. Pat. Nos:

2,817,945
3,295,299
3,362,144
3,483,688
3,604,188
3,606,748
3,641,754
3,894,484
4,280,320
4,559,770
5,052,170

The above listed prior patents do not disclose the crop processor for round hay balers of the present invention.

SUMMARY OF THE INVENTION

An object of the present invention is to provide a crop processor for a round hay baler mounted forwardly of the existing wheels, hay entrance area and pickup tines of a round hay baler with the crop processor including an open bottom housing having a driven rotor oriented horizontally within the housing and including a plurality of longitudinally and circumferentially spaced pivotal knives mounted thereon which are associated with a horizontally disposed shear bar to cut, chop and shred hay, various stem crops and stubble projecting upwardly from the ground surface being traversed with the processed crop material being discharged toward the existing hay entrance area and pickup tines of the round hay baler to form a round bale from the crop material.

Another object of the invention is to provide a crop processor in accordance with the preceding object in which the shear bar is adjustable toward and away from the axis of rotation of the rotor and the knives thereon to vary the cut length of the crop material.

A further object of the invention is to provide a crop processor oriented below the hitch and PTO drive shaft from a tractor to a round hay baler with the rotor of the crop processor being driven from a gear box incorporated into the PTO shaft between the tractor and round hay baler with the existing hitch being provided with a hitch extension which is connected to the existing hitch and connected to the tractor drawbar.

Still another object of the invention is to provide a crop processor for round hay balers as set forth in the preceding objects in which the gear box is drivingly connected to the rotor through a PTO shaft and belt drive system.

A still further object of the invention is to provide a crop processor in which the rotor is a square tube provided with removable ends with a central shaft extending axially from each end for supporting the rotor. The removable ends enable the shaft to be more easily removed or replaced.

Another significant object of the invention is to provide a crop processor for round hay balers supported from the hay baler for floating movement to facilitate traversal of uneven terrain.

An additional significant object of the invention is to provide a crop processor for processing hay, especially alfalfa, other stem crops, stubble and the like in which the cut length of the crop material can be adjusted and discharged into the baler to form a round hay bale for use as bedding, dry feeds, silage and wet feeds including use in total mixed ration (TMR) blending machines which can eliminate the tub grind process for round hay bales.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the crop processor of the present invention illustrating its association with a round hay baler.

FIG. 2 is a front perspective view of the crop processor and round hay baler with portions of the drive system enclosures being shown in open position for illustrating the drive system for the rotor of the crop processor.

FIG. 4 is an enlarged side elevational view, with portions shown in section, illustrating further structural details of the crop processor and the drive mechanism.

FIG. 9 is a side elevational view of the rotor.

FIG. 10 is a transverse sectional view, on an enlarged scale, taken along section line 10—10 on FIG. 9.

FIG. 11 is a fragmental sectional view showing the association of the rotor and shaft.

DESCRIPTION OF THE PREFERRED EMBODIMENT

Figure 3:
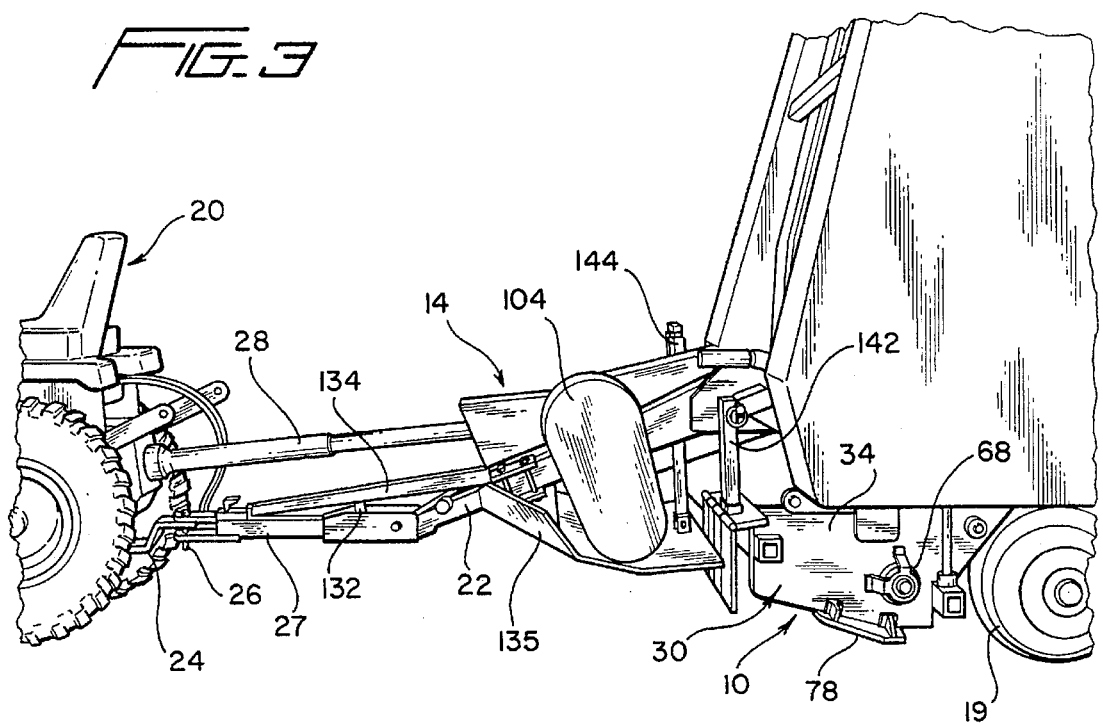
FIG. 3 is a detailed side view of the crop processor including a forward hitch extension and its association with a tractor and round hay baler from the side opposite to that of FIG. 1.

The crop processor of the present invention is generally designated by reference numeral 10 and is illustrated in combination with a round hay baler 12 with the crop processor being supported below the forward end portion of the hay baler, below the rearward end of the hitch and drive assembly 14 for the hay baler 12 and forwardly of the rear axle 16 and wheels 18 of the hay baler and forwardly of the existing hay entrance area and pickup tines and the front wheels 19 of the hay baler. The hay baler 12 is connected to a conventional tractor 20 through the hitch and drive assembly 14 which includes the existing hitch 22 and a forwardly extending hitch extension 27 connected to a draw bar 24 on the tractor through a clevis and bolt or pin 26 at the forward end of the hitch extension 27. The hitch and drive assembly 14 also includes a conventional PTO shaft 28 driven from the tractor 20 in a conventional and well known manner.

Figure 5:
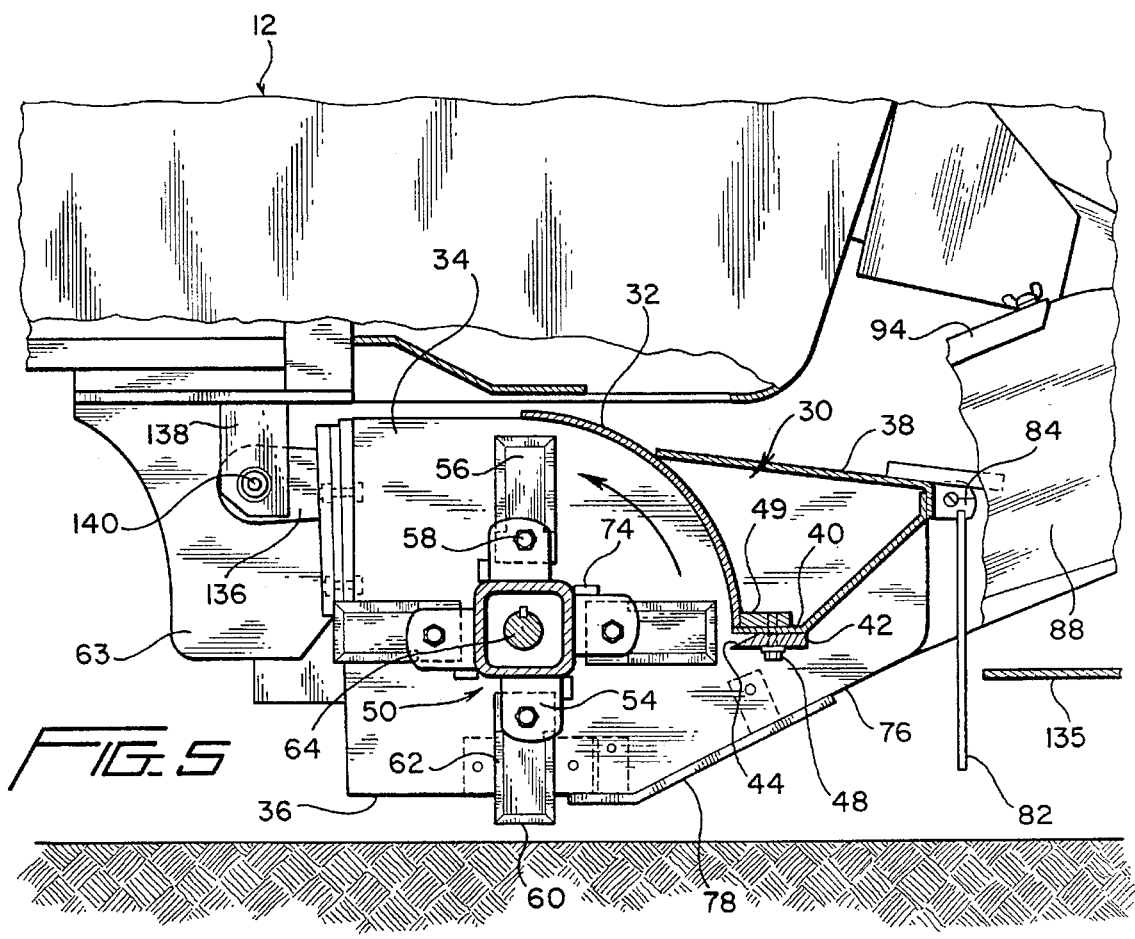
FIG. 5 is a longitudinal sectional view of the crop processor housing, rotor with knives and shear bar.

The crop processor 10 is associated with a round hay baler 12 substantially of conventional construction, although slightly modified. As illustrated, the crop processor can be associated with a John Deere round hay baler such as Model Nos. 535, 435, 375 and 335. The crop processor may also be used with other types of round hay balers which are commercially available. The crop processor 10 includes a transversely extending housing 30 including an arcuate top wall 32, end walls 34, an open bottom 36 and a forwardly projecting nose portion 38 having a transversely extending horizontal narrow wall 40 which supports a shear bar 42 against the undersurface thereof as illustrated in FIG. 5.

Figure 7:
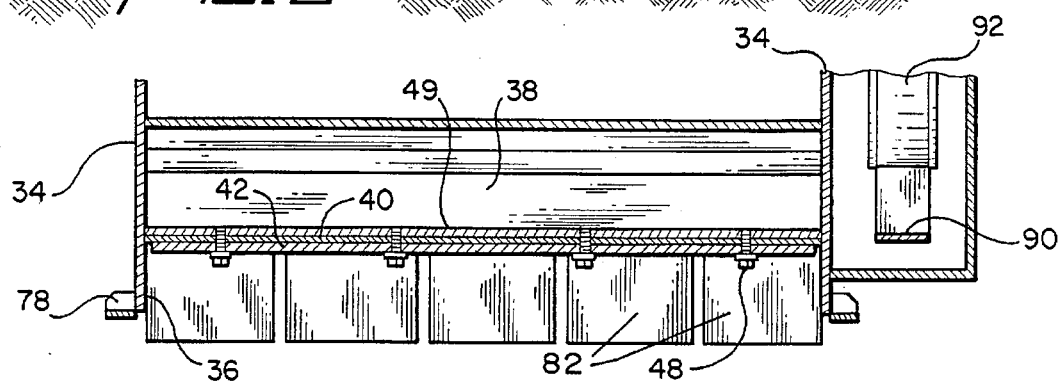
FIG. 7 is a transverse, sectional view taken along section line 7—7 on FIG. 4 illustrating further structural details of the crop processor.
Figure 8:
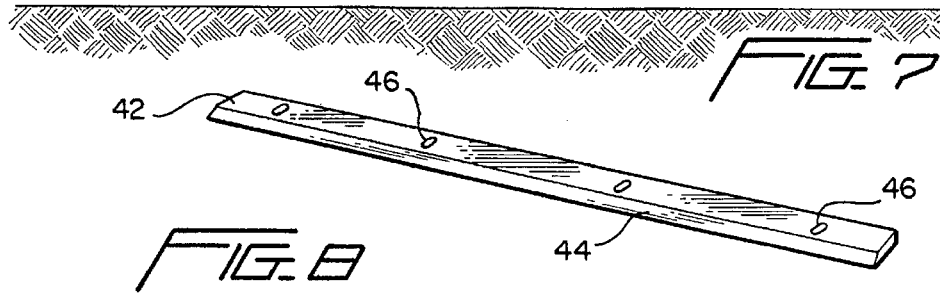
FIG. 8 is a perspective view of the shear bar illustrating the slots which enable adjustment of the shear bar.

As illustrated in FIG. 7, the shear bar 42 is an elongated metal knife blade having an inclined or beveled upper corner on the rearward edge 44 and a plurality of elongated slots 46 having a major axis parallel to the end edges of the shear bar 42. The elongated slots receive mounting bolts 48 which extend up through the slots 46 in bar 42, through the wall 40 and threaded into an anchor bar 49 which engages the upper surface of wall 40. This enables the shear bar 42 to be moved toward and away from a transverse rotor generally designated by reference numeral 50 which is positioned in the housing rearwardly of the shear bar 42 and rearwardly of the arcuate top wall 32 which extends down to and joins with the narrow bottom wall 40.

The rotor 50 includes an elongated square tube 52 extending transversely of the housing 10. Each of the four side surfaces of the square tube 52 is provided with a plurality of longitudinally spaced pair of lugs 54 extending perpendicularly from the surface of one of the side walls of the square tube 52. Each pair of lugs 54 supports a pivotal knife 56 by a pivot bolt 58 which detachably supports the knife 56 from the lug 54 and enables removal and replacement thereof as necessary. While a square tube 52 has been disclosed, the rotor 50 can be a solid shaft and can be cylindrical, a multisided polygon or other configurations which can be rotated at relatively high speed about the longitudinal axis.

Figure 6:
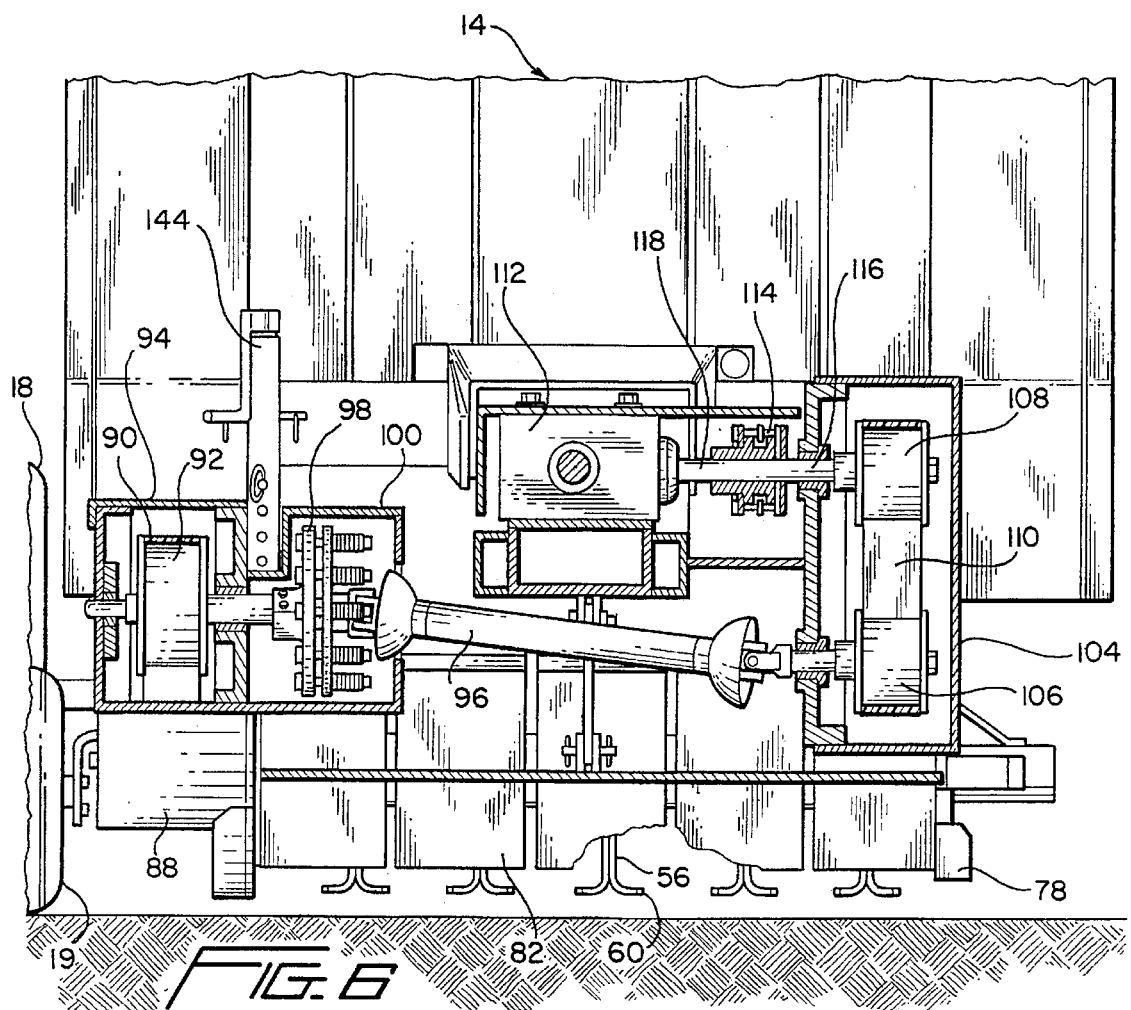
FIG. 6 is a transverse, sectional view taken along section line 6—6 on FIG. 1 illustrating further structural details of the drive mechanism for the crop processor rotor.

Each of the knives 56 are of generally Y-shaped configuration with the outer end portions 60 being outwardly curved as illustrated in FIG. 6. Also, the peripheral edge of each blade is inclined or beveled at 62. The knife configuration disclosed is generally referred to as a side slicing knife. However, other knife configurations can be used such as knives which are T-shaped, L-shaped, J-shaped, cupped or the like. Also, the knife spacing on the rotor can be varied. The rotor 50 rotates in a counterclockwise direction as indicated by the directional arrow in FIG. 5. The rotational axis of the rotor 50 is the center axis of the square tube 52. The outer end of the knives 56 pass close to the downwardly facing surface of the arcuate wall 32 and close to the beveled edge 44 of the shear bar 42 to cut the crop material. Adjustment of shear bar 42 enables the cut length of the crop material being processed to be varied. The processed crop material is discharged through an outlet 63 in the rear of the housing in front of and forwardly of the existing hay entrance area and pickup tines on the baler.

As illustrated in FIGS. 9–11, the square tube 52 of the rotor 50 is supported by a shaft 64 centrally connected to each end of the tube 52 by a flange plate 66 bolted to an end flange 67 rigid with tube 52 and keyed to shaft 64. This drive arrangement enables easy replacement of the shaft 64 and repair or replacement of the rotor. The shaft 64 may extend completely through the tube 52 and can be keyed directly to the end plate 67 on tube 52 or be in the form of axially extending stub shafts. In any event, the shaft is supported on the side walls 36 by outboard bearing structures 68 bolted to the side walls. Each side wall includes a notch or slot 70 extending to the lower edge of the side wall with the notch 70 being closed by a retaining plate 72 to enable assembly and disassembly of the rotor with respect to the housing. The knives 56 are limited in one direction of pivotal movement by stop members 74 rigid with the inner ends of the lugs 54 in the direction of rotation of the knives as illustrated in FIG. 5.

The lower edge of the side walls at the forward end are upwardly slanted as at 76 and include a skid shoe 78 attached thereto by a bracket structure 80 to engage uneven terrain to assure that the periphery of the path of movement of the knives 56 is maintained at a generally constant distance above the ground surface.

At the front of the housing 30, a plurality of depending swing flaps or panels 82 are supported from a bracket structure 84 at the forward end of the nose portion 38 of the housing. The bracket structure 84 enables the panels or flaps 82 to pivot about a generally horizontal axis at their upper ends to enable the panels to swing rearwardly for admitting crop material to enter the crop processor.

One end of the shaft 64 for the rotor 50 is provided with a belt pulley 86 on the end thereof which is contained within a housing 88 with a drive belt or belts 90 extending forwardly from the pulley 86 and encircling a pulley 92 at the forward end of the housing 88. To provide access to the drive belt or belts 90, the upper wall of the housing 88 is provided with a laterally, pivotal cover plate 94 which provides access to the drive belt or belts for the rotor. The pulley 92 is connected to a transversely extending telescopic PTO shaft 96 through a drive slip clutch mechanism 98 which is oriented within a housing 100 provided with a pivotal, curved access door 102. The PTO shaft 96 extends transversely and downwardly under the hitch into a housing 104 on the opposite side of the hitch. A belt pulley 106 is oriented in housing 104 and is connected to the PTO shaft 96. The upper end of the housing 104 is provided with a pulley 108 in alignment with the pulley 106 with a drive belt 110 being used to transmit driving torque to the PTO shaft 96. The pulley 108 is driven from a gear box 112 mounted on the hitch and incorporated into the PTO shaft 28. A chain-type coupling 114 connects an output shaft 118 from the gear box 112 to a supporting shaft 116 for the pulley 108 in the housing 104.

As illustrated in FIG. 4, the PTO shaft 28 inputs into the gear box 112 and the gear box includes the output shaft 118 which extends to the chain coupler 114 and an output shaft 120 to drive the baler. The coupler 114 connects the output shaft 118 to the input shaft 116 to the pulley 108 which drives the belt or belts 110 to the pulley 106 which is connected to the transverse PTO shaft 96. The gear box also includes a rearwardly extending PTO shaft 120 which connects to the drive mechanism of the round hay baler through a slip clutch 122 and universal joint 123. As illustrated in FIG. 2, the components of the PTO shaft 28 and 120 and clutch 122 are covered by pivotal guards 124 and 126 and the chain coupler 114 is covered by a pivotal guard plate 115.

The hitch extension 27 is approximately two feet long. The extension length provides the necessary space to keep the tractor wheels away from the drive system and enables the use of the existing PTO drive line. The hitch extension 27 bolts onto the existing baler hitch 22 through the existing hitch pin hole at 132 and is braced by a channel member 134 which bridges the juncture between the hitch extension 27 and existing hitch 22. The drive structure including the housing 104 is protected by a plate 135 which extends under the hitch assembly and drive mechanism to form the crop material, stalks and the like into windrows as they enter the crop processor and for shielding the drive system.

The rotor speed defined by the knife tip speed is selected for the particular crop material and the condition of the crop material. For dry cornstalks, a tip speed of about 60 MPH is adequate. A faster tip speed, about 115 MPH, is necessary for stem crops and damp or wet silage. Higher tip speeds may be found to be effective for certain crop materials and conditions of the crop material.

The crop processor is supported pivotally at its rearward end by rearwardly extending brackets 136 attached to depending brackets 138 on the round hay baler by a pivot bolt 140. The forward end portion of the housing is supported by upwardly extending support members 142 and 144 which allows the crop processor to float. The structure 144 is a height adjusting jack and the right height adjuster 142 determines the maximum free travel upwards and downwards which allows the processor to float up and down when traversing uneven terrain with gravity causing the front end portion of the processor to return down to normal cutting height when traversing smooth terrain.

The gear box and belt drive arrangement is protectively covered by guards and the two drive belts are Gates Poly Chain or an equivalent drive belt. The PTO drive shaft 28 is used but it is connected to the gear box 112 as an input through a universal joint 29. The output shaft 120 is connected to the slip clutch 122 on the baler through a set of double universal joints 123. The gear box 112 increases the speed and is coupled to the belt drive system 108, 110, 106 and shaft 96 through the conventional chain coupler 114. The PTO shaft 96 extends to the drive pulley 92 which drives the belt 90 and pulley 86 thus driving the rotor 50 at a higher rotational speed than the input from the PTO shaft 28. The unique incorporation of a gear box with outputs for driving the crop processor and hay baler enables the same PTO shaft to be used as was normally used to drive the hay baler. The floating support structure and adjustable shear bar enhance the operational characteristics of the crop processor and enable variation in the cut length of the crop material produced by the processor.

The hay baler and/or the rotor can also be driven by a hydraulic drive system in which the hydraulic pump, fluid supply and hoses can be mounted on the baler or a towing tractor. The drive system could also use a single heavy duty gearbox to drive the baler and crop processor and the crop processor can be mounted on a self propelled baler and be driven by a positive drive systems or a hydraulic drive system. The drive system can use belts and pulleys as disclosed but also can use various positive drive systems including chains and sprocket gears, gearboxes, drive shafts and various combinations of existing positive drive components.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A crop processor for a round hay baler comprising a housing, means supporting the housing from the hay baler at a forward lower area thereof generally below a hitch connecting the baler to a towing tractor, said housing being positioned forwardly of the wheels and pickup tines on the baler, said housing having an open bottom area, a generally horizontally disposed driven rotor rotatably mounted transversely in said housing, a plurality of spaced cutting elements pivotally mounted on said rotor with the outer ends of the cutting elements extending through the open bottom area of the housing to engage, chop and shred crop material and discharge the crop material toward the pickup tines for entry into the hay baler in the same location that hay would normally enter the hay baler to enable the round hay baler to form a round bale of shredded crop material, a shear bar mounted generally horizontally in the housing in generally parallel relation to the rotor and oriented forwardly of and in closely spaced relation to the outer ends of the cutting elements as they rotate with the rotor for cooperating with the cutting elements for cutting, chopping and shredding the crop material and means mounting said shear bar from the housing for adjustment toward and away from the rotor to vary the cut length of the crop material, and means driving said hay baler and rotor to drive the outer ends of the cutting elements at a speed to cut, chop and shred the crop material, said driving means including a power takeoff shaft extending above the hitch from a towing tractor to the round hay baler, a gear box mounted on the hitch and driven by said power takeoff shaft from the tractor, said gear box having a rearwardly extending output drivingly connected to the baler and a laterally extending output drivingly connected to the rotor.

2. In combination, a baler having a forwardly extending hitch and a forwardly opening entrance area in a forward lower area thereof for receiving crop material and pickup tines for conveying crop material to the entrance area, a crop processor comprising a housing, means supporting the housing from the hay baler at said forward lower area thereof below said hitch and forwardly of said entrance area and pickup tines, said housing having an open bottom area, a generally horizontally disposed driven rotor rotatably mounted in said housing, a plurality of spaced cutting elements pivotally mounted on said rotor and extending outwardly from the rotor with the outer ends of the cutting elements extending through the open bottom area of the housing to engage, chop and shred crop material and discharge the crop material toward the pickup tines and entrance area of the baler to enable the hay baler to form a bale of shredded crop material, means driving said rotor, a shear bar mounted generally horizontally in the housing in generally parallel relation to the rotor and oriented in closely spaced relation to the outer ends of the cutting elements as they rotate with the rotor for cooperating with the cutting elements for cutting, chopping and shredding the crop material and means mounting said shear bar from the housing, said means driving the rotor including a power take off shaft drivingly connected to a towing tractor, a gear box drivingly connected to said power take off shaft, a belt and pulley arrangement drivingly connected to an output from said gear box, a transverse shaft connected to the belt and pulley arrangement for driving the rotor, said transverse shaft extending transversely under said hitch extending forwardly from the baler, said transverse shaft being drivingly connected to the rotor by a belt and pulley arrangement.

3. The combination as defined in claim 2 wherein said mounting means for said shear bar enables adjustment of the shear bar in relation to the rotor.

4. The combination as defined in claim 2 wherein said rotor is in the form of a polygonal member, said cutting elements being mounted in longitudinally spaced relation on each side of the polygonal member, the cutting elements on adjacent sides of the polygonal member being longitudinally offset in relation to each other.

5. The combination as defined in claim 4 wherein each side of said polygonal member includes longitudinally spaced pairs of lugs pivotally supporting said cutting elements, each of said cutting elements being a knife having a laterally extending outer end.

6. The combination as defined in claim 2 wherein said rotor drive means rotates the rotor and cutting elements at a speed to cut, chop or shred stemmed hay and other crop materials into cut lengths for baling for use as bedding, dry feeds, silage, wet feeds and in a total mixed ration machine thereby eliminating the use of round bale tub grinders resulting in a more palatable, better and less expensive feed and a more effective and less expensive bedding.

7. The combination as defined in claim 2 wherein said rotor is in the form of a hollow polygonal member, each side of said polygonal member including a plurality of pairs of lugs extending perpendicularly therefrom, each cutting element being in the form of a knife having one end received between the lugs, a pivot bolt extending through the lugs and knife to removably and pivotally support the knife, each cutting knife having a laterally extending end which moves in a path closely adjacent the shear bar, said hollow polygonal member including a centrally disposed shaft extending therethrough, a removable end plate on each end of the polygonal member secured to the shaft to enable replacement of the rotor, said shaft being journaled in bearings supported on said housing.

8. The combination as defined in claim 2 wherein said gear box includes a rearwardly extending output connected to the baler, said output from the gear box drivingly connected to a belt and pulley arrangement extending laterally from the gear box and including a chain coupler incorporated into a laterally extending shaft having the belt and pulley arrangement connected to an outer end thereof with the belt and pulley arrangement extending downwardly for driving engagement with the transverse shaft which extends below the hitch, said transverse shaft being connected to the belt and pulley arrangement connected to the rotor through a slip clutch.

9. The combination as defined in claim 2 wherein said housing includes side walls having a lower edge upwardly slanted at a forward end thereof, each upwardly slanted lower edge including a skid shoe attached thereto to engage uneven terrain to assure that the path of movement of the cutting elements is maintained at a generally constant distance above the ground surface, said housing being pivotally supported at its rearward end from the baler and including supports at its forward end which enables the forward end to float to enable the skid shoes to maintain the relationship of the rotor to the ground surface.

* * * * *